March 11, 1958   G. V. WOODLING   2,826,438
GLAND TYPE FLUID SEAL CONNECTION FOR CONDUITS
Filed Jan. 29, 1952
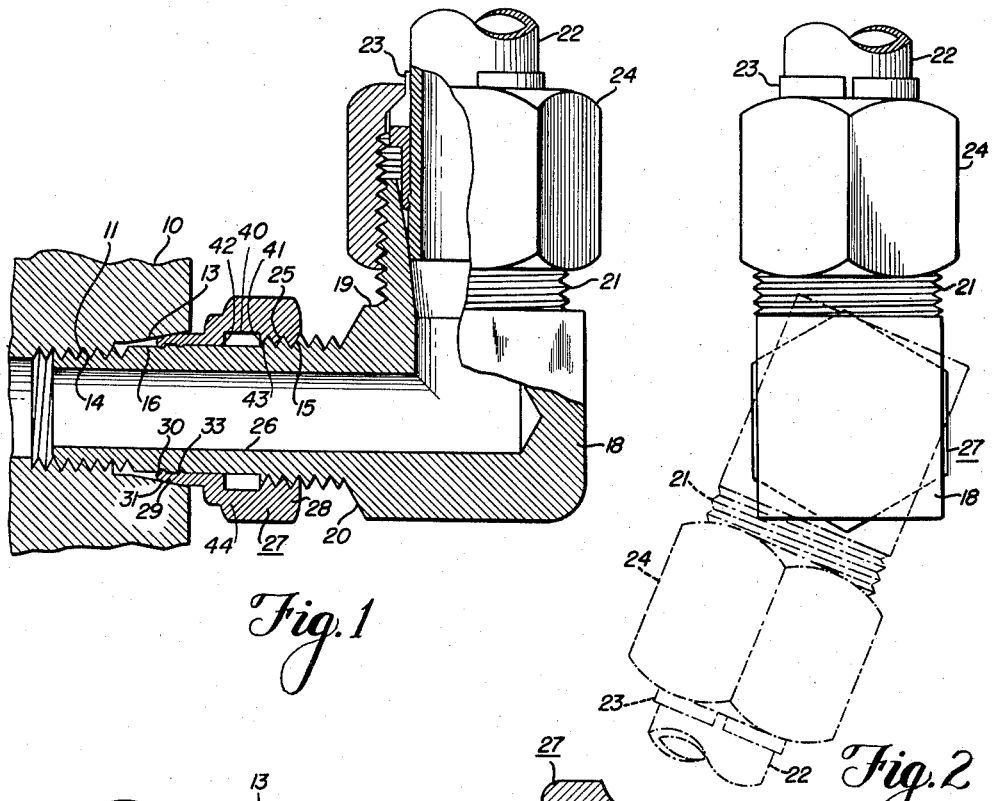
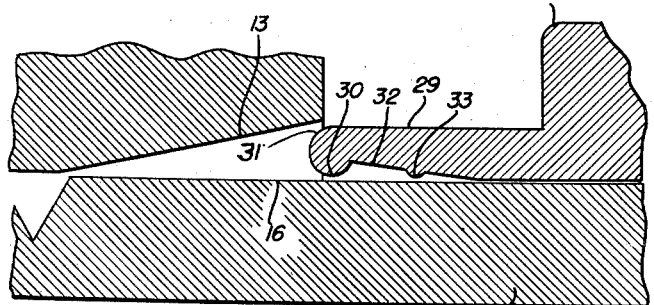
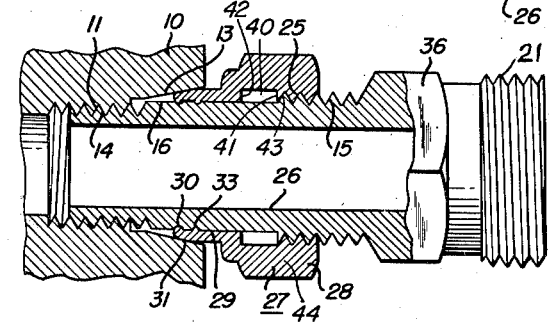
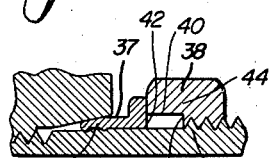
INVENTOR.
George V. Woodling.

United States Patent Office 2,826,438
Patented Mar. 11, 1958

2,826,438

GLAND TYPE FLUID SEAL CONNECTION FOR CONDUITS

George V. Woodling, Cleveland, Ohio, assignor to Gilbert T. Lyon, East Detroit, Mich.

Application January 29, 1952, Serial No. 268,735

5 Claims. (Cl. 285—342)

My invention relates in general to threadable fluid seal connection means between two connectable body members and being particularly of the type where the fluid seal is not effected by pipe threads.

This invention is shown as being applied to fluid tube couplings and is a continuation-in-part of my application Serial No. 198,857, now abandoned, filed December 2, 1950, for Flareless Swivel Fitting.

An object of my invention is to eliminate pipe threads on tube couplings as well as on other parts or devices. In the trade a great deal of difficulty has been encountered by the use of pipe threads to provide a fluid seal for tube couplings, in that the pipe threads do not provide a strong guarantee against leakage. When elbow and T couplings are used with pipe threads to make the fluid seal, it not infrequently happens that the pipe threads are turned tight when the elbow or T coupling is not pointing in the right direction for making the tube connection. Under these circumstances, it is necessary to loosen the elbow or T coupling by an amount less than one turn in order to make an alignment with the tubing. The loosening of the pipe threads renders them subject to leakage. In some installation, the tapped hole for the pipe threads is tapped too deep and thus, when the pipe threads of the coupling are screwed thereinto, the threaded joint cannot be turned completely tight for the reason that the tapped hole is too large and the threaded pipe connection is rendered loose and subject to leakage. In other words, close tolerances must be maintained with pipe threads in order to insure against leakage.

Thus, it is an object of my invention to eliminate pipe threads on tube couplings, as well as on other parts or devices and, at the same time, provide for swivelably swinging the coupling body when turning same into a threaded part.

Another object of my invention is the provision of a coupling having a metal-to-metal sealing surface, without effecting the seal by pipe threads.

Another object of my invention is the provision of a coupling member having a tubular or substantially cylindrical arm portion gripped by a threaded swivel nut having a contractible ring portion which springs slightly away from the cylindrical or tubular arm portion to permit turning or swiveling of the coupling body upon release of the swivel nut.

Another object of my invention is the provision of a coupling member having a tubular or cylindrical arm portion gripped by a threaded swivel nut having a contractible ring portion provided with an inwardly projecting rib which makes its own groove or indenture in the tubular or cylindrical arm portion when contracted and which springs slightly away from the tubular or cylindrical arm portion, including the rib springing slightly away from the surface of its own groove or indenture, but still remaining therein to permit turning or swiveling of the coupling body upon release of the swivel nut.

Another object of my invention is the provision of a coupling member having a tubular or cylindrical arm portion gripped by a threaded swivel nut having a contractible ring portion provided with an inwardly projecting rib which makes its own groove or indenture in the tubular or cylindrical arm portion when contracted and which springs slightly away from the tubular or cylindrical arm portion, including the rib springing slightly away from the surface of its own groove or indenture, but still remaining therein to permit turning or swiveling of the coupling body upon release of the swivel nut, taken in combination with the provision that the contractible ring portion remains permanently connected with a threaded portion of the swivel nut when released.

Another object of my invention is to provide for engaging the tubular or cylindrical arm portion of a coupling body or member with a dome-shaped or wedge-shaped rib in cross-section.

Another object of my invention is the provision for making the contractible ring portion of the swivel nut separate from the threaded portion of the swivel nut, whereby the threaded portion may be turned without turning the contractible ring portion.

Other objects and a fuller understanding of my invention may be had by referring to the following description and claims, taken in conjunction with the accompanying drawing, in which:

Figure 1 is an enlarged and side elevational view of a one-half inch tube coupling drawn to double scale, embodying the feature of the invention with certain portions shown in cross-section to better illustrate the invention;

Figure 2 is an end view of the coupling shown in Figure 1 looking from right to left, the dash-dot lines in Figure 2 showing the manner in which the elbow coupling may be swiveled to any particular direction to accommodate the tubing which is to be anchored thereto;

Figure 3 is an enlarged fragmentary view of the contractible ring portion of the sleeve nut and shows particularly the relationship between the parts prior to camming engagement, the view being drawn ten times size.

Figure 4 shows a cross-sectional view of a straight coupling member provided with the sleeve nut anchored to the tubular or cylindrical arm thereof; and Figure 5 shows a modified form of the threaded sleeve nut, in that the contractible ring portion is made in a separate piece from the threaded portion, whereby the threaded portion may be turned without turning the contractible ring portion.

The reference character 10 represents a connection body which may be a portion of a hydraulic panel, a valve, a pump, or a cylinder, and is preferably provided with a machine thread opening or fluid port 11 having at the entrance thereof an annular internal camming surface 13, which constitutes an entrance passageway leading to the machine threads 11. The conical angle of the camming surface 13 with respect to the axis of the threaded opening 11 may be approximately 10 to 15 degrees.

The coupling which is illustrated may be of the T or elbow type and comprises a hollow intermediate body 18 having an upward side 19 and a left-hand side 20. Extending from the upper side 19 is a hollow arm 21 to which a tube 22 may be connected by means of a sleeve 23 and a nut 24. The construction of a tube 22 and the sleeve and nut may be of any well-known type and particularly of the no-flare type of connection which is shown and described in my Patent No. 2,553,619, for Contractible Sleeve for Tube Fitting. Extending from the left-hand side 20 of the hollow body 18 is a tubular arm 26 which is preferably integrally connected to the connection body 10. The tubular arm 26 comprises male threaded portions 14 and 15 between which is substantially a cylindrical portion 16. The diameter of the cylindrical portion 16 is greater than the pitch diameter of the male threaded portion 14. The male threaded portion 14 threadably engages the female threaded port 11 and is preferably machine threads, although the threaded port 11 and the male threaded portion 14 may comprise pipe threads or any other design or means of engagement to mechanically hold the tubular arm 26 within the port 11. In any event the threads need not make a fluid seal, but need only to make a mechanical engagement. The male threaded portion 14 has a major diameter less than the diameter of the passageway formed by the annular internal camming surface 13 and passes through said passageway prior to being received by the machine threads 11. Surrounding the hollow tubular arm 26 is a threaded sleeve nut 27 having a threaded nut portion 28 provided with female machine threads 25 which engage the threaded portion 15 and a contractible forward ring portion 29 which grips the cylindrical portion 16 of the tubular arm 26. The diameter of the cylindrical portion 16 is less than the outside diameter of the male threads 15, which have an end threaded portion terminating at said cylindrical portion. The sleeve nut 27 has an internal annular recess 40 with opposed first and second end walls 41 and 42 extending laterally inwardly toward the tubular arm 26 and terminating at the bore in the sleeve nut. The female threads 25 in said sleeve nut have an end threaded portion 43 terminating in said first end wall 41. The second end wall 42 is unthreaded and constitutes a stop to the turning of the sleeve nut upon said second end wall 42 engaging the end threaded portion of said male threads 15. The first and second end walls 41 and 42 face each other and are axially spaced apart. A section wall 44 connects the threaded nut portion 28 and the contractible ring portion 29 together. The wall of the recess 40 extends between the walls 41 and 42.

The sleeve is preferably constructed of alloy steel, alloy brass or other metal capable of being hardenable throughout its entire mass to both a resiliency and a hardness value greater than that of the cylindrical portion 16. For a steel sleeve, I find that steel known as 4140, heat-treated throughout its entire mass and tempered to a hardness value of approximately 30 to 50 Rockwell, is satisfactory, the hardness value being preferably in the neighborhood of 38 to 42 Rockwell. For a brass sleeve, used principally for copper tubing, the sleeve may be made of high tensile strength alloy brass, which has both a resiliency and hardness value greater than that of the cylindrical portion 16.

The forward ring portion of the sleeve nut comprises a continuous annular body and preferably has an internal annular dome-shaped rib 30 in cross-section which is adapted to be embedded and make its groove or indenture into the cylindrical portion 16 of the tubular arm 26 when the sleeve is pressed into the conical camming surface 13 by turning the sleeve nut 27. The rib 30, which has two curved, converging side walls that meet to define the annular dome, is adapted to be embedded into the tube when the sleeve is pressed into the entrance flare 13 by the sleeve nut 27. The front side wall constitutes a part of the leading end of the sleeve and merges with an outer annular cam surface 31 which constitutes the outer part of the leading end of the sleeve. On the rearward side of the rib, the sleeve is provided with an internal relief bore having a longitudinally extending annular wall 32 which extends rearwardly from the rib 30 and terminating into a smaller dome rib 33. The radial depth of the rib 30 may be approximately .010 of an inch and the radial depth of the smaller rib 33 may be approximately .005 of an inch. The longitudinally extending internal wall 32 defines, in combination with the external surface of the sleeve, a minimum or weakened wall section, whereby a hinge action is produced so that the leading end section of the sleeve including the large rib 30 and the small rib 33, constitutes a readily contractible ring portion which may be cammed or deflected inwardly against the cylindrical portion 16, notwithstanding the fact that the sleeve is constructed of quench hardenable steel. The thickness of the minimum wall section may be approximately .023 to .025 of an inch which is approximately twice as thick as the radial depth of the rib 30. The thickness of the body portion of the sleeve to the rear of the small rib 33 may be approximately .033 of an inch, and experience shows that with the distance between the rib 30 and the small rib 33 being in the neighborhood of twice the maximum radial thickness of the sleeve, namely, approximately one-sixteenth of an inch, the contractible forward ring portion, including the large rib 30 and the small rib 33 may be readily contractible against the cylindrical portion 16 with the longitudinally extending annular wall 32 compressed against the cylindrical portion.

In operation, as the contractible ring portion 29 of the sleeve is pressed forward by the tightening of the nut, the outer annular cam surface 31 of the sleeve forcibly engages the tapered wall section of the entrance flare or cam surface 13 and thereby produces a camming action which cams or deflects the leading end section of the sleeve against the cylindrical portion 16 of the hollow arm 26. The camming action embeds the rib 30 and the rib 33 into the cylindrical portion 16 to make a good fluid seal. The dome ribs prevent the sleeve from shearing or "plowing up" an annular ridge or shoulder of appreciable size around the cylindrical portion 16 in advance of the rib 30 or the rib 33 of the sleeve. When the longitudinally extending surface 32 of the relief bore engages the cylindrical portion 16 it functions to aid in limiting the degree to which the ribs may be embedded into the cylindrical portion 16.

The maximum wall thickness of the sleeve which is to the rear of the small rib 33 is sufficiently strong and resilient as to present a substantially non-contractible portion, which gives a "hit-home" feeling or high torque value to the tightening of the nut. Both the readily contractible portion and the substantially non-contractible portion are disposed to be pressed against the internal annular cam surface of the entrance flare 13 in the order named. As the sleeve is initially pressed into the entrance flare 13, the readily contractible portion, including the rib 30 and the rib 33 cams or deflects inwardly against the cylindrical portion 16 for gripping the cylindrical portion 16 to make a fluid seal. As the sleeve is further pressed into the entrance flare 13, the substantially non-contractible portion resists further inward contraction of the sleeve, the resisting action limiting the amount that the sleeve may be pressed into the entrance flare 13, and thereby producing a "hit-home" feeling or high torque value to the tightening of the nut.

The engagement of the sleeve against the cylindrical portion 16 and against the entrance flare 13 provides a good, effective main seal against high fluid pressure. Notwithstanding the fact that the threads allow the escape of fluid which is blocked or sealed by the main seal, yet the threads act as a buffer to dampen high peak transient fluid shocks from effectively reaching the main seal.

In my fitting the tubular arm 26 and the sleeve may be repeatedly disconnected from and reconnected to the connection body 10. Upon each reconnection, the sleeve reseats itself for sealing purposes as there is a certain amount of small "give" or yielding to the substantially non-contractible portion and the entrance flare 13, as well as to the hollow arm 26. The "hit-home" feeling which the operator senses upon the tightening of the nut for the initial installation or for the recoupling installations is definite enough to indicate to the operator to cease attempting to turn the nut on any farther. In the event that the coupling is turned or pointed to a new direction from that of the first installation, the ribs make a new set of grooves or indentures in the cylindrical portion 16 when the sleeve nut is reset for effecting a good sealing engagement. Upon release of the threaded nut portion, the ribs slightly spring back out of the groove which they made, but ordinarily remain therein. The sleeve nut 27 may then freely turn about the hollow arm 26. The forward ring portion 29 is permanently connected to the threaded portion 28 and remains permanently connected to the threaded portion and is turnable therewith relative to the hollow arm 26.

In mounting the coupling to the connection body 10, it is only necessary for the operator to turn the threaded portion 14 into the threaded port 11, after which the sleeve nut 27 is turned until it "hits home," at which point a good seal is made between the conical camming surface 13 and the cylindrical portion 16 of the tubular arm 26. Just prior to the time that the threaded sleeve nut 27 is finally turned to its "hit home" position, the coupling may be swiveled or turned to any position for connection with the tube 22 (see Figure 2 as illustration as to how the swivel tube coupling may be swiveled to accommodate a connection for a tube). The swivel joint shown in Figures 1 and 2 accommodates elbow fittings or T fittings and eliminates the use of the pipe threads to effect a fluid seal on this type of fittings. The fluid sealing surfaces are burnished by the action of the hard sleeve against the softer metals.

The tightening of the sleeve nut does not twist the tubular arm 26 because the dome ribs readily turn about the cylindrical portion 16 of the tubular arm 26 as it is cammed thereinto. The sleeve turns easily until the ribs have been pressed into the cylindrical portion 16 for their full depth. Further turning of the nut beyond this point is of no purpose. The live resiliency in the contractible ring portion at the forward end of the sleeve, which causes it to spring back when the contractible camming action is released, is of practical utility when reassembling the connection because this resiliency of the ring portion must be overcome each time that the nut is reassembled and this resilient opposition serves as an indication to the operator that the nut need not be turned very much beyond this point where the resiliency is overcome in order to effect a good sealing action of the sleeve. In other words, the overcoming of the live resiliency when retightening the nut serves to prevent the operator from excessively turning the sleeve nut, which he might otherwise do in the absence of the live resiliency. The live resiliency of the contractible ring portion 29 functions as a lock-device to prevent the threaded sleeve nut and the coupling from readily being vibrated loose.

The sleeve nut 27 may be readily unloosened without twisting the tubular arm 26 because, just as soon as the camming action is released, the forward end of the sleeve including the ribs spring back to free the tubular arm 26. The rib 30 may not spring back completely out of the annular groove or indenture which it made while being cammed into the tubular arm, but springs back sufficiently to provide a small clearance with the cylindrical portion 16 of the tubular arm 26, whereby the sleeve nut 27 is easily turned.

In Figure 4, I have illustrated my invention with a straight coupling to eliminate the pipe threads thereon. When the invention is applied to straight couplings, the tubular arm 26 and the sleeve nut 27 take the place of the pipe threads thereon with the wrench pad 36 and the threaded portion 21 of the coupling remaining the same. A tubing, such as indicated by the reference character 22 in Figures 1 and 2, is connected to the threaded portion 21 by means of the nut 24 and sleeve 23.

In Figure 5, a modified form of the sleeve nut is shown, in that a forward section 37 which includes the forward or leading contractible ring portion 29, is separate from the threaded portion 38, whereby the threaded portion may be turned without turning the contractible ring portion.

When the invention is used for pipe plugs, the same construction applies. In pipe plugs, there is no tubular element 26 but the plug is solid. The sleeve nut operates just the same for a solid plug as it does for a tubular element.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What I claim is:

1. Connection means for making a connection between first and second metallic body members, said first body member comprising, first, second and third portions, said first and third portions having male threads thereon and said second portion being disposed therebetween and comprising substantially a cylindrical outer surface, said male threads on the third portion having an outside diameter greater than the outside diameter of said substantially cylindrical outer surface and having an end threaded portion terminating at said substantially cylindrical outer surface, said second body member having a bore with female threads to threadably receive the male threads on the first portion of said first body member and having an annular internal camming surface surrounding the substantially cylindrical outer surface of the second portion of said first body member, said annular internal camming surface providing an entrance passageway leading to the female threads in the bore of the second body member, said male threads on the first portion of said first body member having an outside diameter less than the diameter of said entrance passageway and passing therethrough prior to being received by said female threads in the bore of the second body member, contractible sleeve nut means comprising first and second metallic parts, said first part including a continuous annular body constituting a contractible terminal end ring including an outer annular cam wall to engage said annular internal camming surface on said second body member and including an inner substantially circumferential wall having a diameter less than the outside diameter of the male threads on the third portion of said first body member and slidably fitting closely around the substantially cylindrical outer surface of the second portion of the first body member, said second part comprising a nut having a thread bore provided with female threads thereon to threadably engage the male threads on the third portion of the first body member to effect a longitudinal movement of said terminal end ring for forcing said outer annular cam wall of said contractible terminal end ring against the annular internal camming surface on said second body member and for camming said inner substantially circumferential wall of said contractible terminal end ring inwardly against said substantially cylindrical outer surface of the first body member, said thread bore terminating in a laterally disposed and inwardly extending thread end wall and said inner substantially circumferential wall terminating in a laterally disposed and outwardly extending annular end wall, said laterally disposed thread end wall and said laterally disposed annular end wall being oppositely disposed to each other and being longitudinally spaced apart, and metallic section wall means connecting said first and second metallic parts of said sleeve nut means together, said section wall means having an inner wall defining in combination with said laterally disposed thread end wall and said laterally disposed annular end wall a recess between said first and second metallic parts of said sleeve nut means, said annular end wall being unthreaded and being oppositely disposed to said end threaded portion of the male threads on the third portion of the first body member.

2. Connection means for making a connection between first and second metallic body members, said first body member comprising, first, second and third portions, said first and third portions having male threads thereon and said second portion being disposed therebetween and comprising substantially a cylindrical outer surface, said male threads on the third portion having an outside diameter greater than the outside diameter of said substantially cylindrical outer surface and having an end threaded portion terminating at said substantially cylindrical outer surface, said second body member having a bore with female threads to threadably receive the male threads on the first portion of said first body member and having an annular internal camming surface surrounding the substantially cylindrical outer surface of the second portion of said first body member, said annular internal camming surface providing an entrance passageway leading to the female threads in the bore of the second body member, said male threads on the first portion of said first body member having an outside diameter less than the diameter of said entrance passageway and passing therethrough prior to being received by said female threads in the bore of the second body member, contractible sleeve nut means comprising first and second metallic parts, said first part including a continuous annular body constituting a contractible terminal end ring including an outer annular cam wall to engage said annular internal camming surface on said second body member and including an inner substantially circumferential wall having a diameter less than the outside diameter of the male threads on the third portion of said first body member and slidably fitting closely around the substantially cylindrical outer surface of the second portion of the first body member, said inner substantially circumferential wall constituting a non-cutting metallic surface for engaging said substantially cylindrical outer surface of the first body member, said second part comprising a nut having a thread bore provided with female threads thereon to threadably engage the male threads on the third portion of the first body member to effect a longitudinal movement of said terminal end ring for forcing said outer annular cam wall of said contractible terminal end ring against the annular internal camming surface on said second body member and for camming said non-cutting metallic surface of said contractible terminal end ring inwardly against said substantially cylindrical outer surface of the first body member, said thread bore terminating in a laterally disposed and inwardly extending thread end wall, and metallic section wall means connecting said first and second metallic parts of said sleeve nut means together, with said non-cutting metallic surface longitudinally spaced from said thread end wall.

3. Connecting means for making a connection between first and second metallic body members as defined in claim 2 characterized in that the inner substantially circumferential wall of the contractible terminal end ring of the contractible sleeve nut means is formed to define at its end which engages the annular inner camming surface of the second body member a circumferential riblike portion for engaging the cylindrical outer surface of the first body member, said riblike portion projecting inwardly beyond the adjacent inner substantially circumferential wall portions of the contractible terminal end ring.

4. Connecting means for making a connection between first and second metallic body members as defined in claim 2 characterized in that the inner substantially circumferential wall of the contractible terminal end ring of the contractible sleeve nut means is formed to define in the end portion which engages the annular inner camming surface of the second body member an internally projecting circumferential rib having a smooth convex inner surface for engaging the cylindrical outer surface of the first body member.

5. Connecting means for making a connection between first and second metallic body members as defined in claim 2 characterized in that the inner substantially circumferential wall of the contractible terminal end ring of the contractible sleeve nut means is formed to define in the end portion which engages the annular inner camming surface of the second body member two axially spaced-apart inwardly projecting circumferential ribs for engaging the cylindrical outer surface of the first body member, that rib which is closest to the end of the terminal end ring projecting inwardly toward said outer surface of the first body member a distance greater than the projection of the rib which is more remote from the outer end of the terminal end ring.

References Cited in the file of this patent

UNITED STATES PATENTS

| 1,030,237 | Hall | June 18, 1912 |
| 1,186,813 | McFerran | June 13, 1916 |
| 1,984,887 | Mackert | Dec. 18, 1934 |
| 2,179,127 | Lauer | Nov. 7, 1939 |
| 2,342,425 | Parker | Feb. 22, 1944 |
| 2,343,235 | Bashark | Feb. 29, 1944 |
| 2,373,253 | Martin | Apr. 10, 1945 |
| 2,394,097 | Parker | Feb. 5, 1946 |
| 2,449,588 | Clafford | Sept. 21, 1948 |
| 2,518,469 | Harding | Aug. 15, 1950 |
| 2,541,141 | Woodling | Feb. 13, 1951 |

FOREIGN PATENTS

| 3,491 | Great Britain | Dec. 7, 1867 |